(12) United States Patent
Bruno et al.

(10) Patent No.: US 8,074,635 B2
(45) Date of Patent: Dec. 13, 2011

(54) CERAMIC BUSHING

(75) Inventors: Adrian A. Bruno, Rolling Meadows, IL (US); Leonard Zelek, Chicago, IL (US)

(73) Assignee: Weber-Stephen Products Co., Palatine, IL (US)

( * ) Notice: Subject to any disclaimer, the term of this patent is extended or adjusted under 35 U.S.C. 154(b) by 1499 days.

(21) Appl. No.: 11/348,080

(22) Filed: Feb. 6, 2006

(65) Prior Publication Data

US 2007/0181118 A1 Aug. 9, 2007

(51) Int. Cl.
*F24C 5/00* (2006.01)
*F24B 3/00* (2006.01)

(52) U.S. Cl. .......................... 126/50; 126/25 R; 16/18 R

(58) Field of Classification Search ............... 126/25 R, 126/41 R, 39 R, 5, 40, 30, 50, 305; 16/2.1, 16/2.2, 18 R; 411/544, 107, 353, 132, 166, 411/82.5; 220/632; 108/156
See application file for complete search history.

(56) References Cited

U.S. PATENT DOCUMENTS

| | | | | | |
|---|---|---|---|---|---|
| 2,816,685 | A | * | 12/1957 | Schaeffer | 220/632 |
| 3,116,362 | A | * | 12/1963 | Rankin | 174/153 R |
| 3,208,808 | A | * | 9/1965 | Knapp | 312/249.13 |
| 3,687,409 | A | * | 8/1972 | Cook | 248/151 |
| 5,794,608 | A | * | 8/1998 | Von Berg | 126/25 R |
| 6,357,344 | B2 | | 3/2002 | O'Grady et al. | |
| 6,591,830 | B2 | | 7/2003 | Wu | |
| 6,727,076 | B2 | | 4/2004 | Bochner | |
| D503,586 | S | | 4/2005 | Johnson | |
| 6,910,476 | B2 | * | 6/2005 | Johnson et al. | 126/41 R |
| 2003/0077142 | A1 | * | 4/2003 | Stone et al. | 411/107 |
| 2004/0154608 | A1 | * | 8/2004 | Ward et al. | 126/41 R |

* cited by examiner

*Primary Examiner* — Kenneth Rinehart
*Assistant Examiner* — Chuka C Ndubizu
(74) *Attorney, Agent, or Firm* — David I. Roche; Daniel A. Tallitsch; Baker & McKenzie LLP

(57) ABSTRACT

The inventions disclosed herein generally relate to isolating heat sensitive components from the heat source of a barbecue grill. In the preferred embodiment, ceramic bushings are used to isolate a glass-reinforced nylon grill stand from the cooking chamber of a barbecue grill. The bushing incorporates a beveled upper edge for engaging with lobes which downwardly depend from the cooking chamber. The bushing also incorporates a circular lower portion for engagement with an aperture in the grill stand. The bushing is locked into engagement with the cooking chamber using a threaded bolt and is locked into loose engagement with the grill stand using a spring clip. The combination of the beveled upper edge and the loose engagement with the grill stand allows the bushing to float with respect to both the grill stand and cooking chamber. As a result, manufacturing tolerance requirements can be relaxed.

16 Claims, 3 Drawing Sheets

CERAMIC BUSHING

BACKGROUND AND SUMMARY OF THE INVENTIONS

The inventions described and claimed herein relate generally to isolating heat on a barbecue grill assembly. In particular, the inventions relate to the use of heat resistant bushings to isolate heat sensitive parts of a grill assembly. The present inventions are described herein in the context of their use with a small portable gas grill, although the claims are not limited as such. The present inventions are equally useful with larger barbecue grills, either gas or charcoal fired.

In recent years, portable barbecue grills have become very popular. Smaller type portable grills, such as the Weber® Baby Q™, have become especially popular due to their small size and light weight. Consumers find it very convenient to use such grills at home and on the road, such as at picnics. Despite the benefits of these small, lightweight grills, manufacturers are generally limited in the type of materials that can be used for the grill. Plastics and the like are generally avoided, at least in locations remote to the cooking chamber, due to the potential for the material to degrade or melt. Consequently, small portable grills are generally constructed of heavy and expensive materials having a high melting temperature. The materials often used include metals such as iron, steel, and aluminum. Not only are such materials expensive, it is also expensive to form and/or machine such materials. The cost of forming the parts of portable grills can be significant given that consumer demand is greatest for grill designs that are complex, functional, and aesthetically pleasing.

It has been found that complex, functional, and aesthetically pleasing components are less expensive when formed from materials such as plastic. For reasons of consumer safety and structural integrity, the inventions described and claimed herein permit the use of such materials by isolating the heat sensitive components from the cooking chamber with a heat resistant bushing. Consumer safety is improved by isolating components adjacent to the cooking chamber from heat by reducing the risk of a consumer inadvertently burning themselves. In addition, structural integrity is improved by reducing the operating temperature of the heat sensitive components preventing melting and/or accelerated degradation of the material.

In the preferred embodiment, ceramic bushings are used to isolate a glass-reinforced nylon grill stand from the cooking chamber of a barbecue grill. The bushing incorporates a beveled upper edge for engaging with lobes which downwardly depend from the cooking chamber. The bushing also incorporates a circular lower portion for engagement with an aperture in the grill stand. The bushing is locked into engagement with the cooking chamber using a threaded bolt and is locked into loose engagement with the grill stand using a spring clip. The combination of the beveled upper edge and the loose engagement with the grill stand allows the bushing to float with respect to both the grill stand and cooking chamber. As a result, manufacturing tolerance requirements can be relaxed.

BRIEF DESCRIPTION OF THE DRAWINGS

These and other features, aspects, objects, and advantages of the inventions described and claimed herein will become better understood upon consideration of the following detailed description, appended claims, and accompanying drawings where:

Figure 1:
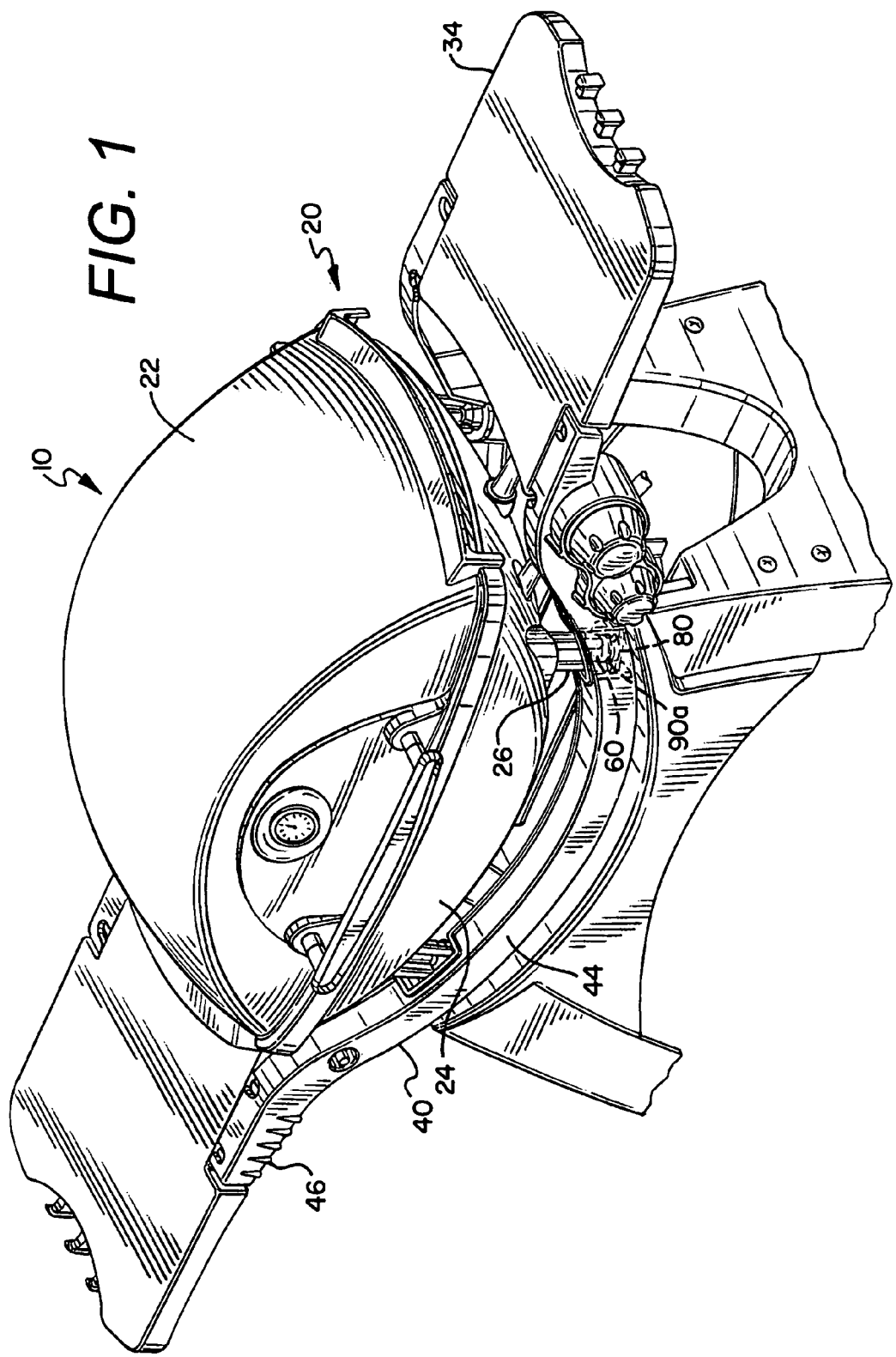
FIG. 1 is a perspective view of an exemplary barbecue grill comprising preferred embodiments of the present inventions shown in dashed lines.

It should be understood that the drawings are not necessarily to scale and that the embodiments are sometimes illustrated by graphic symbols, phantom lines, diagrammatic representations and fragmentary views. In certain instances, details which are not necessary for an understanding of the inventions described and claimed herein or which render other details difficult to perceive may have been omitted. It should be understood, of course, that the inventions described herein are not necessarily limited to the particular embodiments illustrated herein.

Like reference numerals will be used to refer to like or similar parts from Figure to Figure in the following description of the drawings.

DETAILED DESCRIPTION OF THE DRAWINGS

Referring first to FIG. 1, a perspective view of a grill assembly 10 comprising the preferred embodiments of the present inventions is shown. The particular style of barbecue grill depicted in this figure is for example purposes only. It is contemplated that the various embodiments described herein can be used with other types barbecue grills, including non-gas fired grills. The particular grill assembly 10 depicted in this figure is comprised of a cooking chamber 20, a grill stand 40, shelves 34, a bushing 60, a bolt 80, and a locking fastener 90a and/or 90b. Typical grill assemblies 10 also include various other components such as additional shelves, gas tank retainers, and auxiliary burners.

It is contemplated that the bushing 60 is heat resistant. In one embodiment, the bushing 60 is made from a ceramic material. The preferred heat resistant material, however, is commercially available as C-6 Porcelain from Advanced Cerametrics Incorporated, P.O. Box 128, Lambertville, N.J., 08530.

The bushing is preferably disposed between the cooking chamber 20 and the grill stand 40 to isolate the grill stand 40 from the heat generated in the cooking chamber 20. It is preferred that the bushing 60 is disposed directly between the cooking chamber 20 and the grill stand 40, although such configuration is not necessary. Other components can be disposed between the bushing 60 and the cooking chamber 20 and/or between the bushing 60 and the grill stand 40.

The bushing 60 described herein is not limited to use between the cooking chamber 20 and the grill stand 40. Indeed, it is contemplated that the bushing 60 can be used to isolate other frame members of a grill assembly 10, such as between the cooking chamber 20 and a shelf member 34, between the cooking chamber 20 and a handle, between the cooking chamber 20 and a cart, and between the cooking chamber 20 and an outer shell. Additionally, the bushing 60 can be used to isolate other heat sensitive components from other heat generating components, such as an auxiliary burner.

Furthermore, the bushing 60 is not limited to use with a grill assembly 10 having a cooking chamber 20, but also can be used with any outdoor cooking device, including those that do not have an upper member 22. Additionally, the bushing 60 can be used with an outdoor portable fireplace.

The cooking chamber 20 is preferably cast from aluminum, but can be fabricated from any other metal or material which is tolerant of high temperatures. The cooking chamber 20 is preferably defined by an upper member 22 and a lower member 24. The upper member 22 can be a lid which is removable from the lower member 24 or hingedly attached to the lower member 24, as shown. The heat source for the cooking chamber 20 is preferably a gas burner tube for combustion of a fuel such as propane. Alternatively, the cooking chamber 20 can be adapted to use a solid heat-source, such as charcoal.

Figure 2:
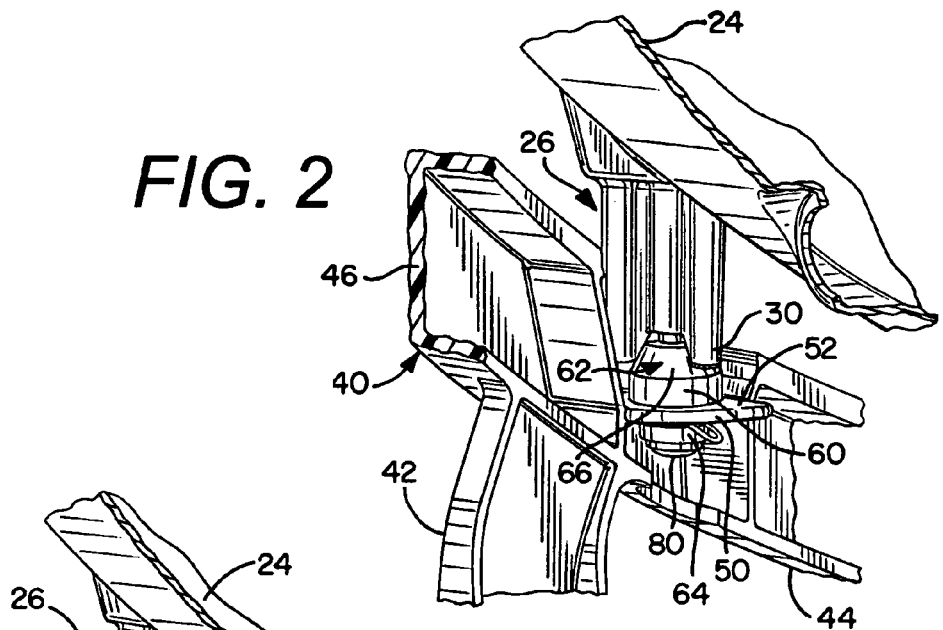
FIG. 2 is a close-up, cut-away view of the preferred embodiments of the present inventions in the assembled orientation.
Figure 3:
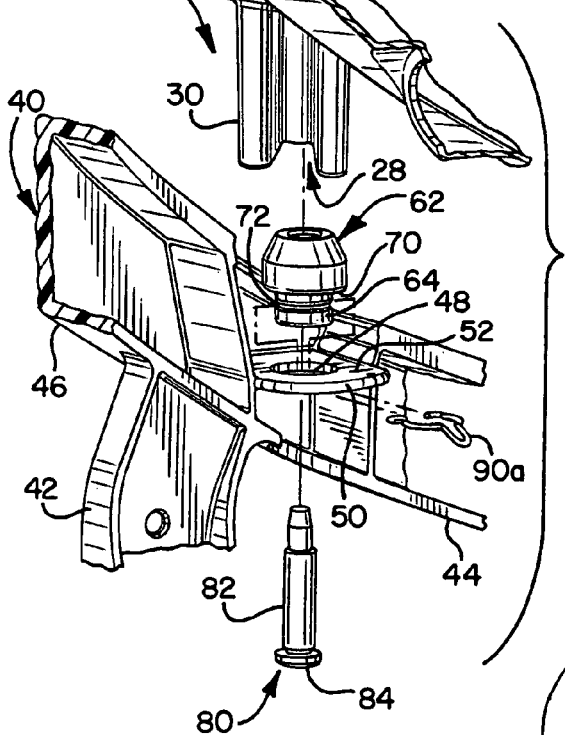
FIG. 3 is a close-up, cut-away, exploded view of the preferred embodiments of the present inventions.
Figure 5:
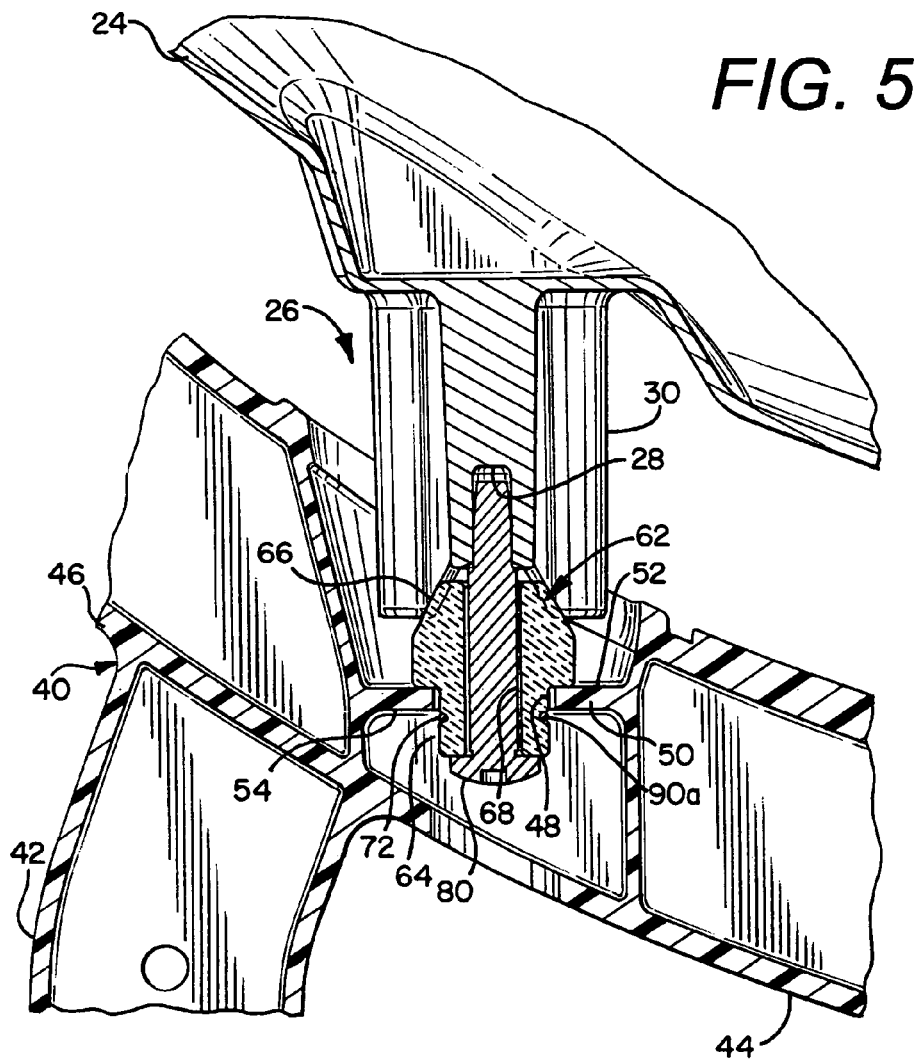
FIG. 5 is a side sectional view of the preferred embodiments of the present inventions; and, FIG. 6 is a top plan view of a preferred locking fastener.

Referring now to FIGS. 2, 3, and 5, the cooking chamber 20 preferably comprises four support members 26 for engaging with the bushing 60, although more or less support members 26 may be satisfactory. The support member 26 is preferably comprised of a threaded bore 28 which is surrounded by a group of lobes 30. However, more or less lobes 30 may be satisfactory. In fact, with minor modification of the bushing 60, it is contemplated that the support member 26 could comprise one lobe 30 having the threaded bore 28 incorporated therethrough. The support members 26 preferably depend directly from the lower member 24 of the cooking chamber 20, being integrally cast. However, the support members 26 may also depend from the upper member 22 of the cooking chamber, if the grill design so demands. Also, the support members may be fabricated as an independent part and attached to the cooking chamber 20 by appropriate fastening means. Additionally, other components may be disposed between the support member 26 and the cooking chamber 20. The support members 26 outwardly depend from the cooking chamber 20; however, the support members 26 preferably downwardly depend from the cooking chamber 20, although the support members could depend to the side of the cooking chamber 20, for example to connect to other components.

The grill stand 40 is preferably fabricated from glass reinforced nylon, but can be fabricated from other materials. Given the heat resistant capabilities of the bushing 60, the grill stand 40 can be fabricated from a material which melts at a low temperature, such as a plastic. The grill stand 40 can be fabricated from a single molded part or can be fabricated from multiple parts which are attached by appropriate fastening means. The grill stand 40 is preferably comprised of legs 42 for supporting the grill assembly 10 on a flat surface. The legs 42 can be independently connected to the cooking chamber 20 or can be interconnected for attachment to the cooking chamber 20. The legs 42 are preferably interconnected by interconnecting members 44, which are preferably curvilinear and generally horizontal to correspond to the shape of the cooking chamber 20. The grill stand 40 can also comprise lateral members 46 for engagement with other components such as shelves and gas tanks. The grill stand 40 also comprises an aperture 48 for engaging with the bushing 60. The aperture 48 is preferably round to correspond to the shape of the bushing 60 and to allow the bushing 60 to spin; however, the aperture 48 could be any other corresponding shape. Preferably, there are four apertures 48, corresponding to the number of bushings 60, although there may be more or less depending upon the number of bushings 60. The aperture 48 is preferably disposed in a planar member 50 which is preferably oriented generally horizontally. However, other design considerations may require the planar member 50 to be oriented vertically, or at an angle. Furthermore, the planar member 50 is shaped to correspond to the shape of a corresponding surface on the bushing 60. If the corresponding surface on the bushing 60 is curvilinear, then the member 50 must also be curvilinear.

With specific reference to FIGS. 2 and 5, the bushing 60 is shown in engagement with the frame member 40 and the cooking chamber 20. Specifically, an upper portion 62 of the bushing 60 is engaged with the support member 26 of the cooking chamber and a lower portion 64 of the bushing is engaged with the aperture 48 of the frame member 40. The bushing has a bore 68 therethrough for receiving the bolt 80. The diameter of the bore 68 is sufficiently larger than the diameter of the bolt 80 to prevent contact between the bolt 80 and the inside wall of the bore 68. Not only does this minimize heat transfer to the bushing 60, it also allows the bushing to float, minimizing the need for tight manufacturing tolerances.

Preferably, the upper portion 62 has a generally larger diameter than the lower portion 64, resulting in an interface between the upper portion 62 and the lower portion 64 which defines a shoulder 70 for engaging with the planar member 50. As an alternative, the upper portion 62 may have the same diameter as the lower portion 64, and may engage with the planar member 50 in another manner, such as an additional locking fastener. The lower portion 64 of the bushing 60 preferably incorporates a groove 72 which extends for at least a portion of the circumference of the bushing 60. The groove 72 is adapted to receive a locking fastener 90a or 90b.

The upper portion 62 of the bushing 60 is preferably characterized by an outwardly facing beveled edge 66, which is adapted to engage with the lobes 30 of the support member 26. The (preferably) trilobal support member 26 allows the cooking chamber 20 to nest on top of the bushing. The three lobes 30 are best shown surrounding the bore 28 in FIG. 2. The nesting feature allows the bushing 60 to float for accommodating greater manufacturing tolerances.

Referring now to FIG. 5, to lock the bushing 60 in engagement with the support member 26, the bolt 80 is inserted into the bore 68 and lockingly engaged with the threaded bore 28 of the support member 26. As discussed above, nesting can be achieved with a varying number of lobes 30. In fact, a single lobe 30 would be sufficient if the bushing 60 was provided with an inwardly facing beveled edge 66. Additionally, the bushing 60 could embody multiple beveled surfaces; for example, one could be on an inside edge and another could be on an outside edge.

For engagement with the grill stand 40, the lower portion 64 of the bushing 60 is received by the aperture 48 with the shoulder 70 resting on a generally upwardly facing surface 52 of the planar member 50, at the periphery of the aperture 48. In this configuration, the groove 72 is disposed below the downwardly facing surface 54 of the planar member 50. To lock the bushing 60 in the aperture 48, the locking fastener 90a or 90b is inserted into the groove. The locking fastener 90a or 90b is characterized by a larger diameter than the aperture 48 such that it engages the downwardly facing surface 54 of the planar member 50 when the bushing 60 is lifted to prevent the bushing 60 from disengaging the grill stand 40. However, the fastener 90a or 90b is preferably in loose engagement with the grill stand 40 to allow the bushing 60 to float and spin. Allowing the bushing 60 to move a limited amount allows greater manufacturing tolerances to be used.

Figure 4:
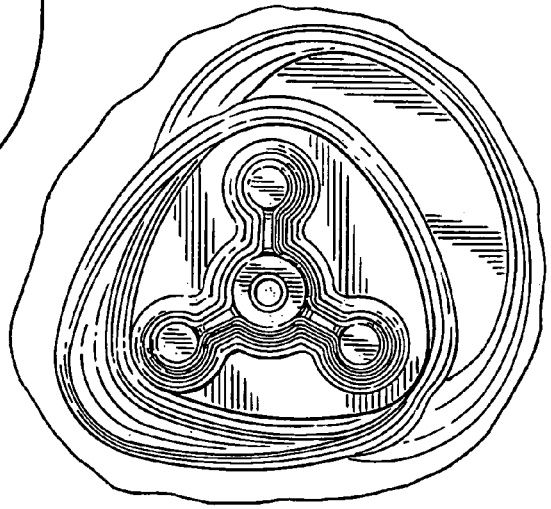
FIG. 4 is a bottom view of the preferred support member.

Referring now to FIG. 4, the bolt 80 is generally characterized by a elongated portion 82 and a head 84. The elongated portion 82 is preferably threaded at least at a distal end for engaging with the threaded bore 28 of the support member 26. However, the bore 28 need not be threaded and the bolt 80 could instead be characterized as a rivet. In fact, the bolt 80 could be any satisfactory fastener.

Figure 6:
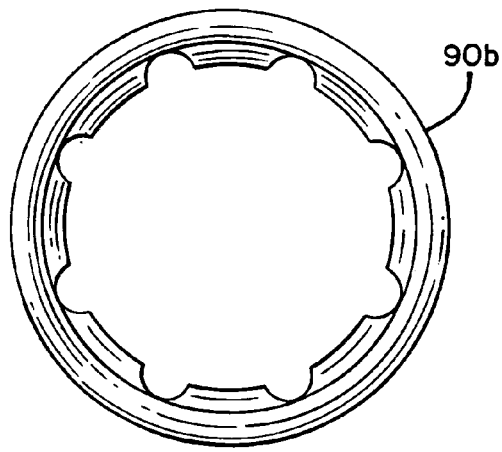

Referring now to FIG. 6, the locking fastener 90b is characterized as a seating lock for engaging with the groove 72 on the lower portion 64 of the bushing 60. However, other fastening means would be satisfactory. For example, the locking fastener 90a is characterized as a spring clip. Alternatively, a cotter pin and corresponding bore would be satisfactory. In an alternative embodiment, the lower portion 64 of the bushing 60 could be threaded and the locking fastener could be characterized as a nut.

Although the inventions described and claimed herein have been described in considerable detail with reference to certain preferred embodiments, one skilled in the art will appreciate that the inventions described and claimed herein can be practiced by other than the preferred embodiments, which have been presented for purposes of illustration and not of limitation. Therefore, the spirit and scope of the appended claims should not be limited to the description of the preferred embodiments contained herein.

We claim:

1. A grill assembly comprising:
   a metallic cooking chamber, a non-metallic frame, a heat resistant bushing, a threaded bolt, and a locking fastener;
   the cooking chamber having an upper member and a lower member, the lower member having a support, the support comprising a threaded bore and a group of at least three generally downwardly depending lobes;
   the frame being adapted to support the grill assembly and having an aperture;
   the bushing being adapted to be disposed between the cooking chamber and the frame to resist the transfer of heat from the cooking chamber to the frame, the bushing having a longitudinal bore therethrough, the bushing having an upper portion and a lower portion, the upper portion having a beveled upper edge for engaging with the at least three generally downwardly depending lobes, the lower portion being adapted to be received by the aperture, an interface between the upper portion and lower portion defining a shoulder whereby the shoulder retains the bushing in the aperture, and the lower portion having a generally circumferential groove which is adapted to be disposed generally below the aperture when the bushing is received by the aperture;
   the locking fastener being adapted to be received in the generally circumferential groove whereby the locking fastener would retain the bushing in the aperture; and,
   the threaded bolt having a threaded portion and a head, the threaded bolt being adapted to be received through the longitudinal bore of the bushing, a distal end of the threaded portion being adapted to engage with the threaded bore of the cooking chamber, and the head being adapted to engage with a lower surface of the bushing to retain the beveled edge of the bushing in engagement with the lobes of the lower member of the cooking chamber.

2. A grill assembly comprising:
   a cooking chamber, a frame, and a plurality of heat resistant bushings;
   the plurality of heat resistant bushings having a substantially greater resistance to heat transfer than the cooking chamber;
   the frame being constructed from a material which melts at a temperature lower than the melting temperature of the material comprising the cooking chamber; and,
   the plurality of heat resistant bushings keeping the cooking chamber separated from the frame and having sufficient resistance to heat transfer to prevent melting of the frame during use of the grill assembly.

3. The grill assembly of claim 2 wherein the cooking chamber has an upper member and a lower member, the plurality of heat resistant bushings keeping the lower member separated from the frame.

4. The grill assembly of claim 3 wherein the frame is adapted to support the grill assembly.

5. The grill assembly of claim 4 wherein the frame is adapted to engage with a grill cart.

6. A grill assembly comprising:
   a cooking chamber, a frame, and a plurality of heat resistant bushings;
   the frame being constructed from a material which melts at a temperature lower than the melting temperature of the material comprising the cooking chamber;
   the plurality of heat resistant bushings keeping the cooking chamber separated from the frame;
   the cooking chamber having an upper member and a lower member, the plurality of heat resistant bushings keeping the lower member separated from the frame;
   the lower member has a plurality of supports, each support comprising a group of at least three generally downwardly depending lobes; and,
   the plurality of bushings having an upper portion with a beveled upper edge for engaging with the at least three generally downwardly depending lobes, whereby the beveled upper edge of the bushing is received between the three generally downwardly depending lobes.

7. The grill assembly of claim 6 wherein the frame has a plurality of chamber supports, each chamber support being adapted to receive a lower portion of the bushing.

8. The grill assembly of claim 7 wherein the chamber support comprises an aperture for receiving the lower portion of the bushing.

9. The grill assembly of claim 8 wherein an interface between the upper portion and the lower portion of the bushing defines a shoulder, the shoulder being adapted to engage the chamber support.

10. The grill assembly of claim 7 wherein:
    the at least three lobes surround a bore;
    the bushing comprises a longitudinal bore; and,
    the grill assembly further comprises a fastener which is adapted to be received by the longitudinal bore and engage with the bore.

11. The grill assembly of claim 10 wherein:
    the bore is threaded;
    the fastener comprises a threaded portion and a head, the threaded portion being adapted to engage the threaded bore and the head being adapted to engage with a lower surface of the bushing.

12. The grill assembly of claim 8 wherein the lower portion of the bushing comprises a groove, the groove extending at least a portion of the circumference of the lower portion and being adapted to be disposed generally below the aperture when the bushing is received by the aperture.

13. The grill assembly of claim 12 wherein the grill assembly further comprises a locking fastener being adapted to be received by the groove.

14. A grill assembly comprising:
   a cooking chamber, a frame, and a heat resistant bushing;
   the heat resistant bushing having a substantially greater resistance to heat transfer than the cooking chamber;
   the frame having a chamber support constructed from a material which melts at a temperature lower than the melting temperature of the material comprising the cooking chamber;
   the heat resistant bushing having a first portion and a second portion, the second portion being adapted to engage the chamber support, and the heat resistant bushing being adapted to separate the cooking chamber from the frame and having sufficient resistance to heat transfer to prevent melting of the frame during use of the grill assembly; and, a fastener being adapted to be carried by the second portion of the bushing to retain the bushing adjacent to the chamber support.

15. The grill assembly of claim 14 wherein:

the cooking chamber has at least one foot; and the heat resistant bushing is in engagement with the at least one foot.

16. A grill assembly comprising:

a cooking chamber, a frame, a heat resistant bushing, a locking fastener, and a bolt;

the cooking chamber having a support member and the support member having a group of at least two outwardly depending lobes;

the frame having an aperture and being constructed from a material which melts at a low temperature lower than that of the cooking chamber;

the heat resistant bushing having a first portion and a second portion, the first portion having a beveled surface, the beveled surface being adapted to engage with the at least two outwardly depending lobes, the second portion being adapted to be received by the aperture, the heat resistant bushing having a longitudinal bore therethrough, the heat resistant bushing being adapted to be disposed between the cooking chamber and the frame;

the bolt having a head and a distal end portion, the bolt being adapted to be received by the longitudinal bore, the distal end portion being adapted to engage with the support member of the cooking chamber, and the head being adapted to engage with a second end of the heat resistant bushing to retain the at least two outwardly depending lobes in engagement with the beveled surface; and, the locking fastener being adapted to lockingly engage with the second portion of the bushing to retain the bushing in the aperture.

* * * * *